United States Patent [19]

Eickmann

[11] Patent Number: 4,799,654

[45] Date of Patent: Jan. 24, 1989

[54] FLUID FLOW FACILITATING ARRANGEMENT WHICH INCLUDES A CONED RING

[76] Inventor: Karl Eickmann, 2420 Isshiki, Hayama-machi, Kanagawa-ken, Japan

[21] Appl. No.: 62,648

[22] Filed: Jun. 16, 1987

Related U.S. Application Data

[63] Continuation-in-part of Ser. No. 801,357, Nov. 25, 1985, abandoned, which is a continuation-in-part of Ser. No. 468,106, Feb. 22, 1983, abandoned, which is a continuation-in-part of Ser. No. 224,769, Jan. 13, 1981, abandoned, which is a continuation-in-part of Ser. No. 788,174, Oct. 16, 1985, Pat. No. 4,701,113.

[51] Int. Cl.$^4$ .............................. F16F 1/20; F16F 1/34
[52] U.S. Cl. .................................... 267/162; 417/271; 417/472; 92/45; 92/46
[58] Field of Search ............... 267/160, 161, 162, 182; 417/472, 473, 271, 273, 171; 92/45, 46, 57; 91/384, 499, 492, 488, 486, 485, 491, 498, 487, 507, 499

[56] References Cited

U.S. PATENT DOCUMENTS

| | | | |
|---|---|---|---|
| 82,276 | 9/1968 | Belleville | 92/46 X |
| 1,341,669 | 6/1920 | Porter | 92/45 X |
| 1,756,911 | 4/1930 | Lee | 92/45 |
| 2,084,496 | 6/1937 | Lockwood | 92/45 |
| 2,162,719 | 6/1939 | Hay | 267/162 |
| 2,250,607 | 7/1941 | Sherman | 308/73 |
| 2,323,985 | 7/1943 | Fausek et al. | 92/45 X |
| 2,387,266 | 10/1945 | Holland | 267/162 X |
| 2,565,108 | 8/1951 | Zahodiakin | 267/162 |
| 2,668,553 | 2/1954 | Howard et al. | 92/45 X |
| 2,768,033 | 10/1956 | Morris | 308/73 |
| 2,889,781 | 6/1959 | Thompson | 92/45 X |
| 3,394,631 | 7/1968 | Thompson | 267/162 X |
| 3,861,277 | 1/1975 | Wagner et al. | 92/45 X |
| 4,047,851 | 9/1877 | Bender | 417/472 X |
| 4,285,197 | 8/1981 | Cloup | 92/45 X |

FOREIGN PATENT DOCUMENTS

| | | | |
|---|---|---|---|
| 0727414 | 7/1943 | Fed. Rep. of Germany | 267/162 |
| 1142752 | 9/1957 | France | 417/472 |
| 0375919 | 10/1939 | Italy | 417/472 |

*Primary Examiner*—Douglas C. Butler

[57] ABSTRACT

An arrangement which includes a coned ring forms with the coned portion an interior space. The interior space decreases and increases its volume, when the coned portion of the ring is compressed and de-compressed. The coned ring has a radial outer portion and a radial inner portion. The radial inner portion forms a bore. The radial outer portion is provided with a seat face portion. The seat face portion contacts and bears a respective portion of a body, which may be a second coned ring, a thrust body or an outer ring. The arrangement is utilized to center a coned ring relative to a neighboring body or to provide and effectively seal a working chamber for the reception and expulsion of a fluid.

7 Claims, 4 Drawing Sheets

FLUID FLOW FACILITATING ARRANGEMENT WHICH INCLUDES A CONED RING

REFERENCE TO RELATED APPLICATIONS

This is a continuation in part application of my co pending application Ser. No. 801,357, filed on Nov. 25, 1985, now abandoned, which is a continuation in part application of application Ser. No. 468,106, filed Feb. 22, 1983, now abandoned, and which was a continuation in part application of application Ser. No. 224,769, filed on Jan. 13, 1981, now also abandoned. This is also a continuation in part application of my copending application Ser. No. 788,174, filed on Oct. 16, 1985, now U.S. Pat. No. 4,701,113, issued on Oct. 20, 1987.

BACKGROUND OF THE INVENTION (a) Field of the Invention

This invention relates to the field of disc-springs, like Belleville springs and to the field of fluid pumps and fluid motors. More specifically the springs of the invention are provided with means to center a spring relative to a neighboring body or to use the interior space in the coned ring portion as a space of a fluid pump or fluid motor for the reception and expulsion of fluid, like liquid or gas.

(b) Description of the Prior Art

In the prior art Belleville springs, also called disc-springs or dish-springs have a coned portion which forms an interior space radially inside of the coned portion. Plural springs are set axially oppositionally directed onto each other to form a spring collumn. To prevent radial departure, the plural springs were either guided by an interior shaft or the plural springs were fixed together by soldering or welding.

As far as the springs were used as pump mechanism, they were for small pressures rather, because internal spaces remained when the springs were compressed. The internal spaces formed dead space portions, which contained compressed fluid, which reduced the efficiency of the pump or motor. At high pressures the coned portions bowed axially out and prevented a full delivery of fluid under higher pressure. The arrangements of the former art required expensive additional parts to operate the springs at equal axes.

SUMMARY OF THE INVENTION

An object of the invention is, to provide a coned ring with a radial inner portion defining a bore and a radial outer portion defining a seat face portion with the coned portion between said inner and outer portions forming radially inside of said coned ring portion an internal space which periodically increases and decreases its volume when the coned portion expands or compresses axially.

The second object of the invention is, to provide an axially extending outer portion on one of the rings of a pair of rings to embrace the radial outer end of the other ring of the pair of rings.

The third object of the invention is, to set an outer ring between two adjacent and axially oppositionally directed coned rings to form a seat for a plastic seal radially inwards of the outer ring and between the neighboring coned rings.

The fourth object of the invention is, to insert an inner ring inside of the outer ring and inside of the seat for the seal with the inner ring filling a portion of the space between the neighboring springs or coned rings to prevent dead space with internal compression in fluid, when the arrangement is used as a pump or motor.

The fifth object of the invention is, to periodically expand and compress one or more coned rings by a drive means which includes an eccentric cam ring, while a piston and piston shoe are interposed between the mentioned cam ring and a respective coned ring. To make the periodic expansion and compression possible, this object includes the guide of the piston to prevent deformation and blocking of the coned ring arrangement.

Details of the objects of the invention are, to overcome technological problems of the arrangements of the former art by stabilizing, strengthening and economizing the arrangement.

Further aims and objects of the invention will become apparent from the description of the preferred embodiments and from the enclosed claims. The enclosed claims are considered to be a portion of the disclosure of the present invention.

BRIEF DESCRIPTION OF THE DRAWING

FIG. 15 is a longitudinal sectional view through a further embodiment of the invention, while

DESCRIPTION OF THE PREFERRED EMBODIMENT

Figure 1:
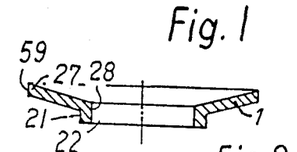
FIG. 1 is a longitudinal sectional view through an innerbend spring.

In FIG. 1 the referential 1 defines the coned portion of the innerbend spring of this Figure. The mentioned coned portion is common to most disc springs of the former art. Commonly, the disc springs of the former art consisted only of the mentioned coned portion with a centric bore therein.

On the radial outer end of the coned portion 1 the outer seat 59 is formed and commonly roughly a cylindrical outer face. On the radial inner end of coned portion 1 the inner portion 21 is formed in the form of about a cylinder, extending axially from the inner part of the coned portion in the direction of the inward inclination of the coned portion 1. The inner face 28 of the inner portion defines the bore 22 therein. Since the inner portion 21 is bent from the coned portion 1, and bend on the radial inner end of the coned portion 1, this spring is called herein the "innerbend spring". The radial outer portion of the coned portion 1 is shown by 27 and it ends in the outer seat 59.

Figure 2:
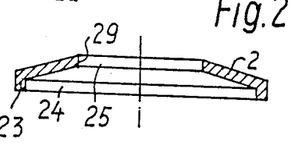
FIG. 2 is a longitudinal sectional view through an outerbend spring of the invention.

In FIG. 2 the coned portion 2 ends radially inwardly by the inner seat 29 which is again roughly a cylindrical face, in this case, a cylindrical inner face. It borders the medial bore 25. On the radial outer end of the coned portion 2 the spring is bent in axial direction in the direction of inclination towards the outer end of the spring and the bended portion defines the outer portion. Since the bent portion of this spring is located on the radial outer portion of the coned portion, this spring is called: the "outerbend spring". The outer portion 23 forms again roughly a cylinder with a hollow space 24 therein. Portion 2 lies above the radial distance ΔR with angle of inclination=8.

The outer bend spring of FIG. 2 and the innerbend spring of FIG. 1 are forming together a disc spring pair.

Figures 5, 6, 7, 8:
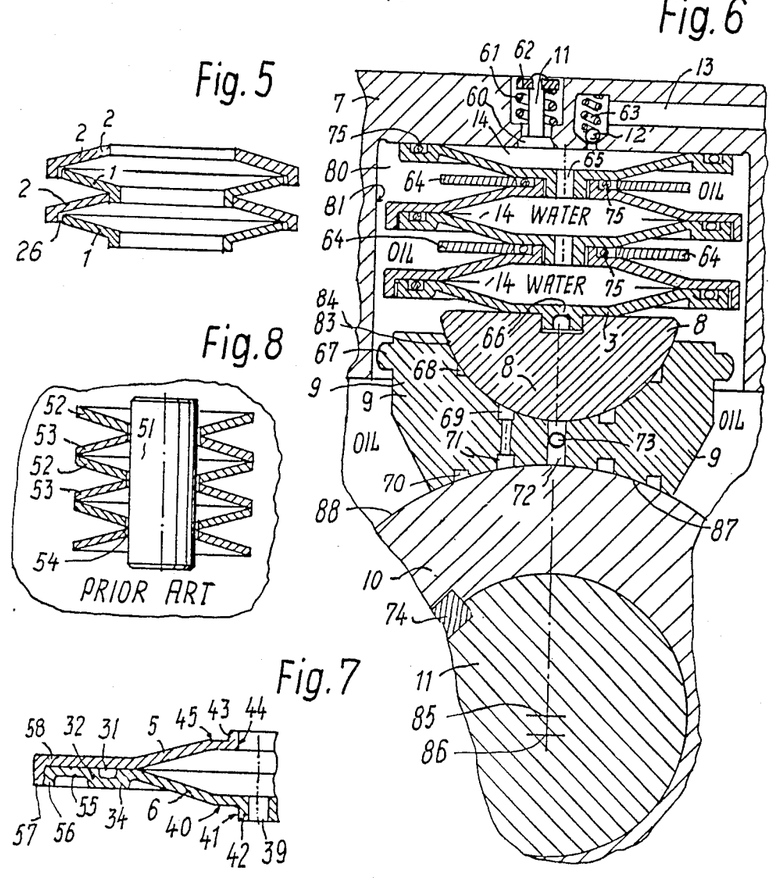
FIG. 5 is a longitudinal sectional view through a spring pair set of a plurality of spring pairs of FIGS. 1 and 2.
FIG. 6 is a longitudinal sectional view through a portion of a pumping arrangement, which can also be a radial sectional view, wherein the springs of FIGS. 3 and 4 are assembled.
FIG. 7 demonstrates a portion of a pair of springs of FIGS. 3 and 4 wherein radial extensions are provided to make these springs capable of especially great thrusts and strengthes.
FIG. 8 is a longitudinal sectional view through a set of disc springs of the former art and consequently labeld as "prior art".

FIG. 5 demonstrates, how the springs of FIGS. 1 and 2 are mounted to a disc spring set. The upper spring 2 is an outerbend spring and its outer portion embraces the outer seat of the innerbend spring 1. A slight space or clearance 26 must be provided between the outer portion and the outer seat in order to permit slight expansion of the innerbend spring in the outerbend spring during compression of the innerbend spring 1. On the outerbend spring 2 of the next spring pair, which is assembled below the upper spring pair, the inner portion of the innerbend spring of the top spring pair is inserted into the inner seat of the outerbend spring of the bottom spring pair. Thereby the two pairs of springs are centered relative to each other while each spring of the equal spring pair is centered automatically to the other spring of the same spring pair. The pairs added are assembled similarily.

The assembly of FIG. 5 thereby demonstrates, that the spring pairs of the invention are self-centering and do not require the setting of a medial guide bar in the bores of the springs as was commonly required in the disc springs of the former art.

The commonly used disc springs of the former art are shown in an assembly of the style of the former art in FIG. 8. The former art disc springs 52 and 53 of FIG. 8 consisted of simple coned portions with a bore therein. They were axially of each other assembled with opposite inclinations of the cones of neighboring springs 52,53. A guide pin 51 was extended through the medial bores of the disc springs to center the springs 52 and 53 relative to each other and to guide them along the guide bar 51. Since the springs compress also slightly radially inwardly, when they are compressed axially, a clearance 54 was provided and required between the springs 52 and 53 and the guide bar 51 of the former art. That sometimes prevented a clear allaround line contact between the neighboring springs 52 and 53 of the former art and sometimes resulted in a point or two point contact between two neighboring springs of the former art. That prevented effective work of the former art disc springs and the thrusts of them then departed from the pre-determined spring thrusts.

It is one aim of this invention to overcome the difficulties of the former art and also to spare the medial guide bar of the disc springs of the former art.

Figure 3:
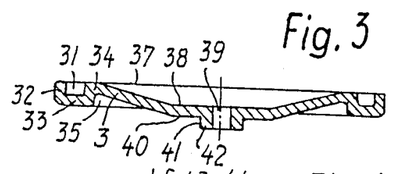
FIG. 3 is a longitudinal sectional view through another embodiment of an innerbend spring of the invention.

In FIG. 3 the innerbend spring of the other embodiment of the invention has the medial coned portion 3. Radially inwards thereof extends the substantially radial first radial plane portion 38 with the seal seat 40 thereon. Seal seat 40 ends radially inwardly on the downwardly extended inner portion 42 with guide seat 41 as the outer face and medial bore or passage 39 therein. The inner portion 42 is otherwise as described for FIG. 1. On the radial outer end of the coned portion 3 is the sealseat portion 33 provided. It forms substantially a hollow ring portion with a cross-sectional area which is "u-shaped". The interior of the "U-shape" forms the sealseat groove 31, which is bordered by portions or walls 32,33 and 34 of sealseat portion 33. Wall 33 may be radially substantially plane, while walls 32 and 34 form outer and inner walls of cylindrical shape of the "u-shaped" seal seat portion surrounding the circular sealseat groove 31. The mentioned sealseat groove 31 is open in the axial direction oppositely directed relatively to the axial direction of the extension of the inner portion 42. Radial inner spaces 35 and 37 are formed endwards of the coned portion 3.

Figure 4:
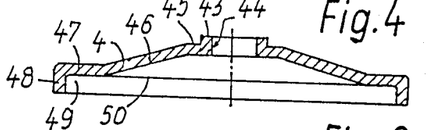
FIG. 4 is a longitudinal sectional view through another embodiment of an outerbend spring of the invention.

In FIG. 4, the coned portion 4 extends from its radially innermost end into the second radial plane portion with seal face 45 on the upper axial end thereof. Radially inwards of the second radial plane portion with seal face 45 the extension 43 forms a cylindrical portion extending axially upwards in the Figure and forming therein the radial inner guide face 44 which has a diameter substantially equal to the outer diameter of the cylindrical face 41 of the inner portion 42 of the innerbend spring of FIG. 3. The spring of FIG. 4 is an outerbend spring, namely the outer bend spring of the embodiment of FIGS. 3 and 4. Inner face 44 is a substantial cylindrical face and able to fit around extension 42 of FIG. 3. The dimensioning must be respectively properly. On the radial outer end of the coned portion 4 the spring extends into the third radial plane portion 47 and on the radial outer end of the mentioned third radial plane portion 47 is the bended outer portion 48 provided. Radially inside of it is the space 50 provided which extends to the cornered inner space 50. The third radial plane portion 47 forms a seal cover by one of its axial end faces. The extension 43 extends in the axial direction of the radial inward inclination of the coned portion 4, while the bended portion, which is the outer portion 48 extends in the opposite axial direction. Otherwise the outer portion is provided similar or formed similar to that of FIG. 2.

In FIG. 6 a preferred application of the springs of FIGS. 3 and 4 is demonstrated. They are here utilized to act as main members of a pump. The housing 7 forms a hollow body with an opening downwards in the Figure. The top of the Figure contains the top-cover which in the Figure closes the interior space 80 in one axial direction. Cover 7 is provided with an inlet means which might consists of a passage periodically opened and closed by valve 11. Seat portion 60 is the valve seat, 11 the valve shaft; 61 the valve spring and 62 the holding cover for the spring 62 of the valve. The opening and closing of the valve 11 arrangement can act as in common pumps as inlet means. In housing, body or cover 7 is also the outlet means 12 provided, which is shown in the Figure as an outlet valve 12 closed by spring means 63. From the outlet means 12 extends the outlet passage 13 for the delivery of fluid which is pumped in the interior space between the respective spring sets. At least one spring pair of the embodiment of FIGS. 3 and 4 of the invention is mounted into the hollow space in the hollow body 80. It is however preferred to assemble a plurality of spring pairs of FIGS. 3 and 4 therein, for example, as actually is shown in FIG. 6. When the springs of the pairs are properly assembled relatively to each other as shown in FIG. 6, an interior spring space 14 is formed between the springs. It is called the "interior chamber" 14.

At least partially deformable seal rings, for example lead rings, copper rings or plastic seal rings 75 are inserted into the circular seal seat grooves 31. Similar seal rings of suitably fitting sizes are inserted into the seal seats 40. The respective extension 43 of the neighboring spring of FIG. 4 embraces the respective inner portion 42 of the respective spring of FIG. 3. The respectively inserted seal ring 75 is then located between seal seat 40, seal face 45 and extension 43 of the respective two neighboring springs of FIGS. 3 and 4 which are engaging each other by the cylindrical faces 41 and 44 while the upper end of extension 43 engages a portion of the seal seat 40. As is also shown in FIG. 6, the dead space filling body 64 may be assembled radially outwardly around the mentioned seal ring 75 in seat 40. The outer diameter of dead space filling body should preferredly conform to the inner diameter of the seal seat portion 33,34 to fil the space 35 when the springs are compressed.

In the assembly of FIG. 6 the upper seal seat groove 31 is closed by the plane bottom face of the top cover of body 7. Otherwise the seal seat grooves 31 are closed by the respective third radial plane portions 47, namely by the respective radial plane endfaces thereof. The seal seat portions 31 to 34 of the springs of FIG. 3 are inserted and kept and guided in the spaces 49 of the springs of FIG. 4 radially inwards of the respective outer portions 48. Since the inclinations of the coned portions 3 and 4 of the respective springs are mounted in opposite directions at neighboring springs, the interior chambers 14 are forming coned spaces 14 when the springs are decompressed. The plurality of interior spaces 14 are communicated by the respective passages 65, which are also parts of or are the bores in the respective springs. To prevent dead space or to reduce the dead spaces in the pumping arrangement of FIG. 6 to a minimum, the passages 65 should be of the smallest possible diamter permitting about equal efficiency of dead space and flowthrough occurances. The single interior spaces 14 are sealed by the seal rings 75. Instead of setting the springs of FIGS. 3 and 4 into the pumping arrangement of FIG. 6 the springs of FIGS. 1 and 2 might become inserted thereinto without seals 75, if the proper sealing of the spaces 14 is provided without seals 75 or by the springs of FIGS. 1 and 2.

It is preferred to prevent the passage 65 in the bottommost spring and instead to provide on the bottom end, compared to the top end, the spring with a closing portion 66 for the closing of the interior spaces 14 in one axial direction. Otherwise the closing would have to be done by the thrust body 8. The thrust body 8 is assembled on one end of the spring pair set, in the FIG. on the bottom end of it. Thrust body 8 may have a centration on the closing portion 66 or on the endmost respective spring of the spring set.

In FIG. 6 the thrust body 8 and the thereto bottomwards attached slide shoe 9 are engaging each other in slideable faces 83 and 84 which are formed with equal radii around a common center to permit a pivotal movement of the slide shoe 9 relatively to the thrust body 8. The top end face of thrust body 8 bears on the bottom of the respective portion of the respective spring of the spring pair of the invention. The end remote from the thrust body forms on slide shoe 9 a hollow part-cylindrical slide face 87 which slides along the outer face 88 of the therebelow assembled eccentric cam 10. Eccentric cam 10 with centre 86 revolves with shaft 11 with center line 85. A respective distance between center lines 85 and 86 forms the eccentricity between outer face 88 and center line 85, whereby during the revolution of cam 10 the portion of face 88 engaging face 87 moves upwards and downwards whereby the springs in the hollow body 7 are periodically compressed, while they are decompressing under their own spring force. Each one compression and one decompression during each revolution of cam 10 and shaft 11. The eccentricity between center lines 85 and 86 is suitably dimensioned to fit with the compression and decompression motion of the springs in space 80. At the mentioned decompression fluid is passed through inlet 11 into the interior space(s) 14 and out thereof through outlet 12 under pressure, which might be a high pressure until a couple of tenthousand psi, during the respective compression stroke.

One of the features of the arrangement now described, is, that there are no relatively moving parts in the pumping arrangement. The motion of attached face portions of the springs is only minor and only fractions of millimeters. The consequence thereof is, that the arrangement is capable of pumping non-lubricating fluids in the interior spaces 14. In the drawing this non-lubricating fluid is shown with the words "water" but it might be any other non-lubricating or lubricating fluid.

On the other hand, there are relatively to each other moving faces 83,84,87 and 88 on the thrust body, slide shoe and the cam, 8, 9, 10. When these faces would not be lubricated, they might weld. It is therefore recommended to lead a lubricating fluid, which is written "OIL" into the interior space 80 in body 7 and into the space which surrounds the cam 10, slide shoe 9 and thrust body 8.

Key means 74 may prevent rotation of cam 10 on shaft 11 and slide shoe 9 may be provided with guide portions 67 for proper keeping or guiding in space 80 or along interior face 81 of body 7.

In FIG. 6 the guide portion 67 of slide shoe 9 is only losely fitted with a large clearance in the inner face 81 if body 7. That is quite proper, when only the interior chambers 14 which are formed between the springs, are used for the pumping of a fluid. It should be understood however, that the guide 67 may get a rather close fit along the inner face 81 of body 7, or that seal means may be provided between shoe 9 and the inner face 81 of the hollow body 7. In such a case a respective inlet means and an outlet means would have to be provided to the space 80 which then inside of body 7 would form a second pumping space. The second pumping space would act parallel to the pumping spaced formed by the interior chambers 14 within the springs of the spring pairs of the invention. When the mentioned second pumping space 80 shall pump a high pressure in the respective fluid the assembly of the before described dead space filling bodies 64 is important for a good efficiency of the pump of the second pumping space 80. Because without the filler bodies 64 there would remain dead spaces, formed by spaces 35 of the springs of FIG. 3 and these dead spaces 35 would be dead volume in the second pumping chamber 80 which would reduce the efficiency of the second pumping chamber by internal compression losses in the to be pumped fluid.

Fluid pressure balancing pockets, which might be circular grooves 69,71 may be provided to both end faces of the shoe 9 and may be communicated together by a respective bore and be communicated to the medial passage 72. Pressure limitation recesses 68, 70 may be provided to limit the fluid pressure loaded areas of faces 83,84,87,88 to proper dimensions and the recesses 68,70 may be communicated to respective low pressure spaces.

Since, when the springs are very strong and the pressure in the fluid pumped in the interior chambers 14 and/or in chamber 80, is very high, the forces which are pressing faces 83 and 84 as well as faces 87 and 88 together, are extremely high, it is preferred to lead at the periodic time intervalls of the compression movements, fluid, especially lubricating fluid, under a respectively high pressure into the balancing recesses 68,71 and 72. This can become established and timely suitably become controlled by the provision of a control fluid passage 73 through a member, for example through shoe 9. Shoe 9 may get axial plane end faces fitting slidingly along plane control faces of the housing of the device—not shown in the Figure—whereby a fluid supply through control ports in the said faces of the housing into passages 73 and 72 could be timely properly controlled in relation to the compression strokes. Low pressure would then act in passages and recesses 72,73,68,71 at decompression movements while high pressure would act therein at times of compression-pumping delivery movements of the device and arrangment.

When the arrangement of FIG. 6 is assembled into or attached to a device, machine or vehicle which has a fluid pump or a fluid motor, the pressure line in the respective pump or motor might become communicated to the fluid supply through the mentioned housing into passages 72,73. An addition of a fluid pressure supply device to passage 73 can then be spared and the communication, here described, will not too much reduce the power or efficiency of the respective pump of fluid motor.

FIG. 7 demonstrates a spring pair of an other embodiment of the invention. In this Figure the embodiment is especially suitable for very high thrust capability and strength of the springs of the pair. The coned portion 5 of the outerbend spring has for this purpose a radially very drastically widened third radial plane portion 58, which is widened radially so wide, that the outer portion 57 embraces the drastically radially extended fourth radial plane portion 55 of the innerbend spring with coned portion 6. The said fourth portion 55 extends radially from the sealseat portion 32-34 radially outwardly, provides thereby the added strength to the spring and may be provided with a bend portion 56 to be fitted therewith into the outer portion 57 of the outerbend spring with coned portion 5.

Figure 9:
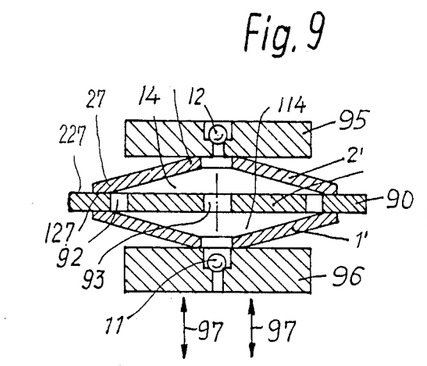
FIG. 9 is a longitudinal sectional view through another embodiment of an arrangement of the invention.

FIG. 9 demonstrates in a longitudinal sectional view a simple pump—or motor—arrangement including a coned ring. The body 95 has an outlet means 12, while body 96 has an inlet means 11. Body 96 may be reciprocated up and down along the arrows 97. Body 95 carries the first coned ring 2' with its interior space 14. Body 96 carries the second coned ring 1' with its interior space 114. The first and second coned rings 1' and 2' are axially oppositionally directed, so, that their interior spaces 14 and 114 would face each other, if the first and second coned rings or springs 1' and 2' would be laid directly onto each other. The specifity of FIG. 9 however is, that the both springs or coned rings 1' and 2' are not laid directly onto each other, but a radially plane ring 90 of rigid,—non-plastic—material is inserted between the radial outer ends of the springs 1 and 2. This is a very important arrangement of the present invention. This ring 90 is also called an outer ring, because it is a hollow ring with an inner space radially inside of the ring 90. There it forms the seat space 92 for the reception of a plasticly deformable ring, for example, a seal ring, or O-ring. It is very important, that the outer ring ring 90 is a plane ring of equal thickness and of a thickness to which a fitting seal ring is available. Outer ring 90 must also be of radial rigidity, which means, that it must be radially strong enough not to break under pressure in the interior space radially inside of the ring 90. Thereby it extends radially outwardly beyond the radial extensions of the coned rings 1' and 2'. FIG. 9 thereby demonstrates in a longitudinal sectional view an arrangement which includes a coned ring 1' or 1' and 2' or more coned rings, comprising as the arrangement in combination, a coned ring, for example 2', a first body for example, 95, a coned ring, for example 1', and a second body, for example 96,90 or 2', with said coned ring 1' inserted between said first and second bodies 95, 90,2',96, said coned ring comprising a coned portion 1' between a radial inner and outer portion 28,27 with an interior space 14 formed radially inwards of said coned portion 1' or 2', wherein said radial outer portion 27 of said coned ring 1,1' or 2' forms a seat face portion 127, wherein one of said bodies forms a complementary face portion 227, and, wherein said complementary face portion is laid against said seat face portion, namely 227 against 127, whereby said coned ring 2' is borne on said body, for example, 90, or 96, 95 and 90; 90 and 96 or 95 and 96.

Respective seat face portions and complementary face portions are preferrably also formed on coned ring 1' and/or on bodies 95 and-or 96.

The significance of this arrangement of the invention is also, that it is simple in construction, easy to be made and specifically safe, tight and reliable in operation. It has been found at trying out the arrangement, that it will not work for high pressure in fluid in the interior spaces or working chambers 14,114, when the springs or coned rings 1,2 are too thin. They must have a thickness, which must be at least one tenth, but better exceed one tenth, of the radial distance from the inner diameter to the outer diameter of the coned ring or spring 1,2. Without such thickness, which is the minimum thickness and which can still be bigger, the coned rings or springs will axially bow out under pressure in chanbers or spaces 14,114 and the outer ends will then not hold together. It has further been found, that a very proper seal ring is required to prevent escape of leakage out of spaces 14,114. Because under the pressure in the spaces 14, 114, the springs 1 and 2 deflect axially and radially. That leads to portions of plastic seals entering the seats between springs 1' and 2', if springs 1' and 2' are laid directly onto each other. The entering of portions of plastic seals or the opening of a gap between the neighboring ring springs 1' and 2' makes the pumping or motoring arrangement non-workable and unefficient with high leakage, if the springs 1' and 2' are laid directly onto each other. The invention now discovered, that the difficulties of leakage and opening of a gap can be prevented by the provision of the seat faces 127 on the radial outer portions 27 of the spring, coned ring or springs respectively coned rings 1' or 1' and 2' together in combination with the insertion or provision of a radially plane ring 90 between the otherwise neighboring springs or rings 1' and 2'. Such radially plane ring is called "the outer ring" because it is proper, to insert also an "inner ring" 91 into the arrangement of FIG. 9. The radially plane faces of the outer ring 90 are now forming the respective complementary face 227 to be complementary to the seat face 127 of the respective spring or coned ring and to bear thereto. The interior space of the outer ring 90 then forms a seat space for the reception of a plastic seal, like for example an O-ring. The seal seat space is shown by referential 92 in FIGS. 9 to 11. The axial thickness of the outer ring 90 should be properly dimensioned to have a desired axial length of the seal space 92 for slight compression of the seal ring therein, when it is inserted. To prevent the described entering of portions of seal rings into a gap or clearance, the radial dimension and axial thickness of the outer ring 90 is important. The inner diameter of the outer ring 90 should substantially correspond to the inner diameter of the seat face 127 of the respective spring or coned ring 1' or 2' to both thereof. To prevent internal compression of fluid in the interior chamber inside of the outer ring and disc springs 90,1 and 2, the inner ring 91 should be inserted radially inside of the seal seat 92. The inner ring 91 should be preferrably of the same axial thickness as the outer ring 90 is and, when the assembly or arrangement is supposed to compresse completely to radial planeliness of the coned rings 1',2', the inner ring 91 should be radially plane, as the outer ring 90 is. Inner ring 91 should be provided with a bore 93 to communicate the internal spaces 14 and 114 inside of the coned rings 1' and 2' to a common working chamber 14.

Figure 10:
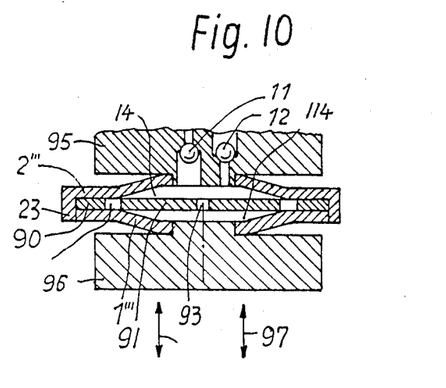
FIG. 10 is still another longitudinal sectional view through still a further embodiment of an arrangement of the invention.
Figure 11:
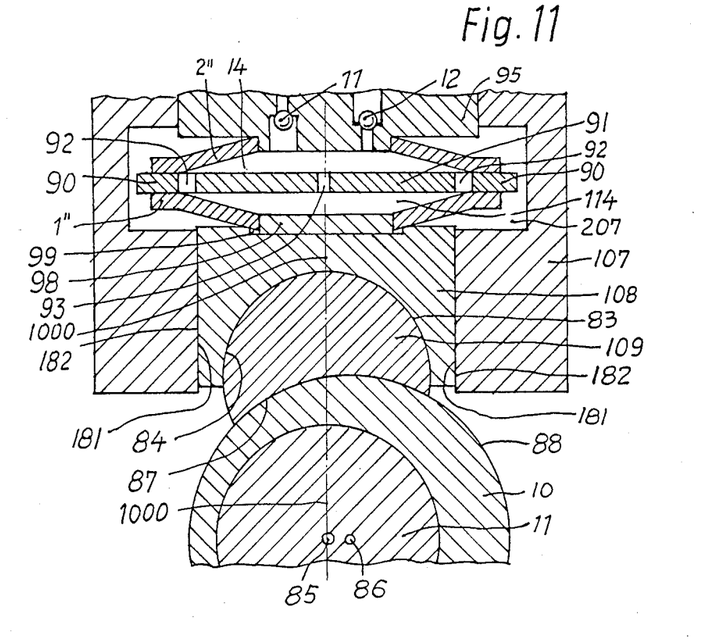
FIG. 11 is a longitudinal sectional view through a final and preferred arrangement of the invention.

FIGS. 10 and 11 show the equal arrangement of the outer ring, inner ring and seal space 90,91,92,93, between two otherwise adjacent oppositionally directed coned rings or disc springs 1'' and 2'' or 1''' and 2'''. In FIGS. 9 to 11 the seal seats or seal spaces 92 are shown, but the seal rings, like O-rings, are not inserted in the Figures. If they would be written into the Figures, the seal seats would not be clearly visible in the Figures any more. Therefore the seals are not written into the Figures. But it is assumed, that the reader of the Figures will clearly understand, how a circular seal ring is laid into a circular seat or annular ring ring groove 92.

The specifity of FIG. 10 is, that the coned ring 1''' has on its outer portion an axially bend portion 23 which formes a cylindrical portion in axial direction. The inner diameter of the cylindrical portion 23 corresponds substantially to the outer diameter of the outer portion of the other coned ring 2'''. Thereby the second coned ring 2''' is kept within the axial extension or bend 23 of the first coned ring 1'''. It is important here, that the first coned ring 1''' has a smaller radial expansion at axial compression, than the second coned ring 2''' actually has. Therefore it is required to have at the axially decompressed or expanded configuration of the coned rings or disc springs 1''' and 2''' a small radial clearance between the outer diameter of the second ring 2''' and the inner diameter of the axial extension 23 of the first ring 1'''.

FIG. 11 contains in its upper portion the same arrangment as FIG. 9. In FIG. 11 the arrangement is in a larger scale and the seat face portions are provided on radially plane outer portions of the coned rings or disc springs 1'' and 2''. If the size of the coned rings of FIG. 9 are provided in FIG. 11, the outer ring 90 extends radially outwardly beyond the rings 1'' and 2''. Head body 95 contains the entrance and exit valves 11 and 12 to the interior spaces 14 and 114, which form over the bore 93 in inner ring 91 the working chamber 14-114 or simply 14. The coned rings or disc springs 1'' and 2'' are periodically compressed and expanded, which means axially compressed and expanded by the reciprocal movement of drive piston 108 along the common axis 1000. The common axis 1000 is the coinciding axis of the axes of the coned rings 1'' and 2'', of the inner and outer rings 90 and 91, of the piston 108 and of the cylindrical portion 107 of the housing of the arrangement of FIG. 11. The shaft 11 revolves around the centrical axis 85 of the shaft 11. An eccenter-ring 10 is mounted on shaft 11 to revolve with shaft 11. The eccentric ring 10 has an outer guide face 88 for the guiding of the inner guide face 87 of the piston shoe 109. The guide face 88 is formed cylindrically with a constant radius around the eccentric axis 86 and thereby the outer face 88 is eccentric relative to the axis 85. The result thereof is, that at revolution of shaft 11 and eccentric ring 10 the outer face 88 thrusts the piston shoe 109 periodically upwards against the piston 108, whereby piston 108 presses against the coned ring 2 to compress it and coned ring 2 presses against the outer ring 90 to move it upwards, while the outer ring 90 presses against the first coned ring 1'' to compress it. Thereby the working chamber 14 is reduced to its smallest volume. At further rotation of shaft 11, the expansion follows, at which the described movements appear in opposite direction along the common axis 1000, whereby the springs 1'' and 2'' expand, while the working chamber 14 expands to obtain its largest volume. A similar action is also reported at hand of FIG. 6. However it has now been found, that the arrangement tends to block and to stop, when no specific care has been taken to prevent radial displacement of the piston, piston shoe or spring or coned ring(s). The movement of the outer face 88 along the inner face 87 of the piston shoe 109 occurs under heavy load from the springs 1'', 2'' against the faces 88, 87. This results in friction between faces 87 and 88. This friction tries to move the piston shoe 109 away from the common axis 1000 in the direction of the movement of the guide face 88. When such movement or dislocation of the piston shoe 108 occurs, the swing centre or pivot centre dislocates away from the common axis 1000. The result thereof is, as the invention discovers, a variation (increase) of the distance of the face 87 from the top body 95. Since however, the face 88 does not permit an increase in the axial distance from the top body or first body 95, the assembly blocks. No part moves any more and everything in the arrangement of FIG. 6 or 11 would stop and stick.

The invention now has at intensive trials found out, that such stopping and sticking can become prevented by the provision of the cylindrical inner face 181 on a cylindrical portion 107 and the fitting of an outer face 182 of cylindrical piston 108 on the cylindrical inner face face 181 of cylindrical portion 107. The cylindrical portion 107 must be respectively fixed to maintain and keep the locations and positions of the first body or top cover 95 and shaft 11 around axis 85 in the respective relation relatively to each other.

The cylindrical faces 182 and 181 should be axially long enough to provide a good guidance and to prevent tilting of the axis of the piston 108. In the arrangement of FIG. 6 the radial dislocation away from the common axis 1000 is prevented by the guide portions 67 on piston shoe 9.

Comparing the arrangements of FIGS. 6 and 11, it will be seen, that FIG. 6 demonstrates the guided piston shoe, while FIG. 11 demonstrates the guided piston in the arrangement of the fluid pump or motor with eccentric cam drive means for the periodic expansion and compression of at least one coned ring or disc spring. One of the members, either the piston shoe or the piston should be guided in accordance with the invention, if the arrangement builts axially long along the common axis 1000. Only in case of axially very short arrangements, for example such wich have only a single or only a single pair of disc spring(s) or coned rings, may the guidance of the piston or shoe be spared. The described parts, details and functions of one of the Figures apply similarily to respective others of the Figures. Thereby description of similar parts and referential numbers in pluralities of the Figures is spared at others of the Figures when it is done at one of the Figures. The relationships, which have been described for the outer rings 90, inner rings 91, seal seats 92 for plastic seals 75 of FIG. 6, seat face portions 127, complementary face portions 227, thicknesses of coned rings and so on, are important to obtain the desired result of the invention. A safe and reliable action of the arrangements of the invention can be obtained, if the details, which are described are fully obeyed.

In FIG. 11 the faces 83 and 84 are formed again with equal radii around a common center. Thereby the piston shoe 109 can pivot with its pivot face 83 on the bearing bed 84 of of piston 108. The seal rings of FIG. 6 are not shown in FIG. 11 in order to make the seal ring seats 92 more clearly visible. In the actual assembly, the mentioned seal rings are, however, inserted into the seal ring seats 92 of FIG. 11.

The clearance 26 in FIG. 5 is preferred to correspond to the following equation:

$$\text{Radial size of } 26 = 0.5\{\sqrt{(\Delta R \times tg\gamma)^2 + (\Delta R)^2} - \Delta R\}$$

in which the equation gives the radial distance of the gap 26 in FIG. 5, with "delta R" being the radial distance between the radially inner and outer ends of the coned portions of the rings, while the angle of inclination of the coned portions is "gamma" and "tgγ" is the tangent of angle "gamma". To obey this rule is suitable to prevent pressing of portions of the rings under force.

In FIGS. 9 and 11 in which the outer ring 90 deforms radially outwards under the pressure in fluid radially inside of this outer ring 90, it is preferred to extend the ring 90 radially in such extent that it deforms substantially parallel to the radial outwards movement of the radial outer ends of the coned rings during their axial compression in order to limit or prevent a relative radial movement between the ring 90 and the adjacent coned rings 1', 1", 2' and/or 2".

When the spring pair set pump assembly is mounted to a machine or vehicle, which has a pump or a fluid motor, it is especially convinient to communicate the respective pressure passage of such pump or fluid motor with the mentioned pressure space.

A respective control arrangement may then become provided to ensure the properly timed communication of the mentioned pressure space during compression action of the springs with the respective passages, ports or like and thereby with the respective faces between the thrust body, slide shoe, outer face of the cam or the respective pluralities of them.

When a seal means is provided between the inner wall of the mentioned hollow body and the thrust body or the slide body, the chamber which then formes between the inner wall of the hollow body and the outer faces of the springs as well as the respective thrust body or slide shoe may be utilized as a second pumping chamber. The second pumping chamber may supply a respective flow of fluid which may be later combined with the flow of fluid out of the chamber between the springs or it may be passed away from the pumping arrangement separately.

For a high uniformity of flow it is preferred to arrange a plurality of spring set pumping arrangements around the common eccentre-cam or other suitable driving means. The suction stroke of the pump will be accomplished mostly by the expansion force of the disc springs of the disc spring pairs.

For corrosion providing liquids or gases it is preferred to make the disc springs of the invention by non-corroding materials, metals or plastics.

Figure 12:
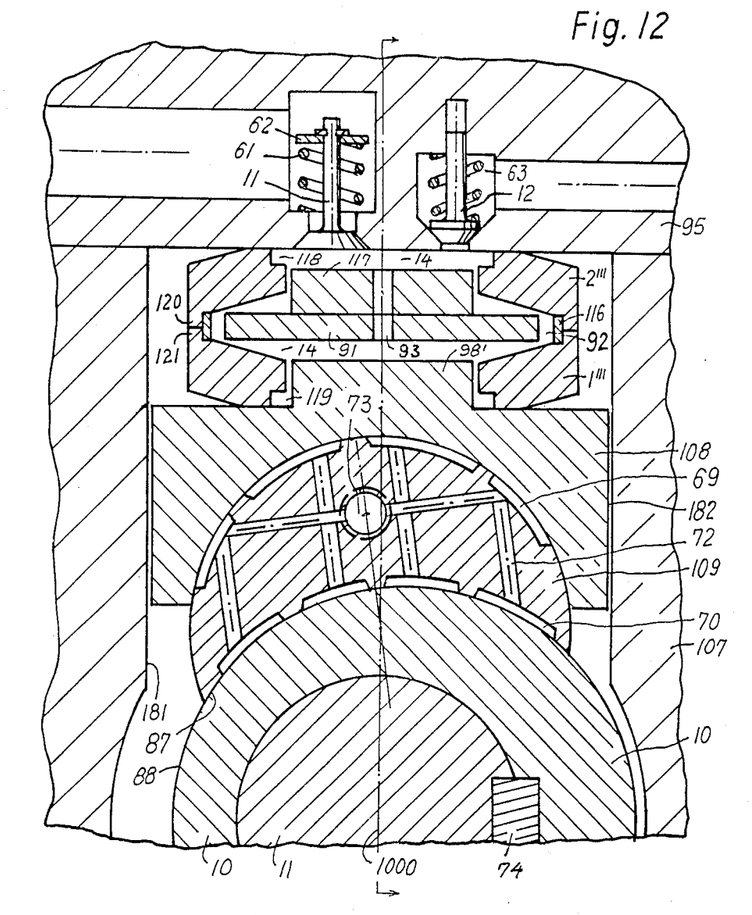
FIG. 12 is a longitudinal sectional view through a further embodiment.
Figure 13:
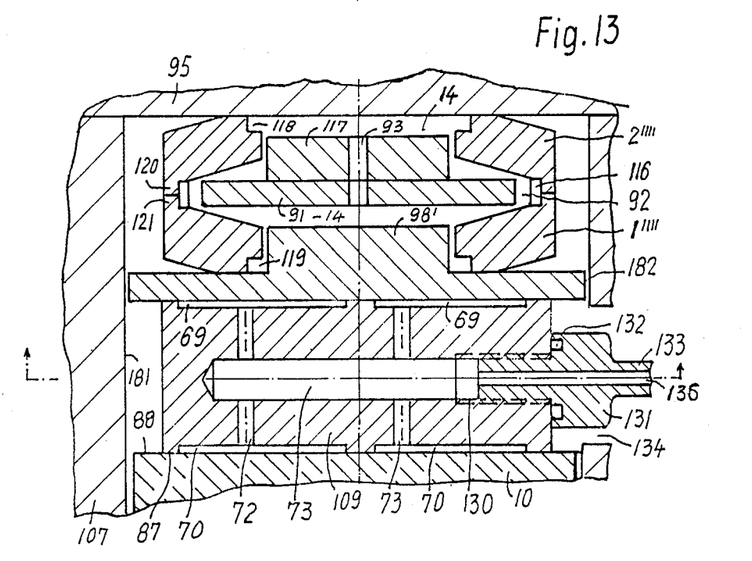
FIG. 13 is a sectional view through FIG. 12 along the arrowed line of FIG. 12.
Figure 14:
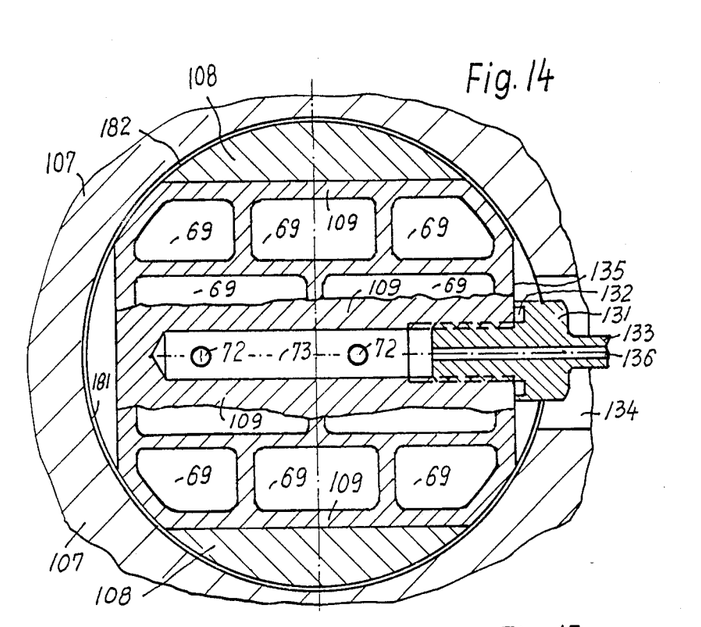
FIG. 14 is a sectional view through FIG. 13 along the arrowed line of FIG. 13.

The embodiments of the invention of FIGS. 12 to 14 correspond substantially to FIG. 11. As far as referential numbers appear in these Figures which are already known from FIG. 11, or from other Figures, they will not anymore be discussed for FIGS. 12 to 14. FIG. 12 is the sectional view similar to that of FIG. 11, while FIG. 13 is the sectional view through FIG. 12 along the arrowed line of FIG. 12 and FIG. 14 is the cross sectional view through FIG. 13 along the arrowed line of FIG. 13.

The specialities of FIGS. 12 to 14 are that dead space preventing inlet valve(s) 11 and outlet valve(s) 12 with coned seats are assembled, that coned ring elements 1'''' and 2'''' for very high pressure are assembled and that a specific supply arrangement for the lubrication and fluid pressure balancing pockets of the piston shoe is provided.

Note that for water jet cutting very high pressures are required, for example 2000 to 4000 atmospheres or up to 65000 psi. In such case the radial load on the elements, housing, piston shoe etc. is very high and amounts in the 1/1 scale of the Figures to more than onehundredthousand kilograms. Consequently, the elements 1'''' and 2'''' are very thick axially and their cross sectional area is radially very short. If only one side of the section is seen the elements are about half as thick as they are radially extended. At these conditions the stroke of the respective element is very short, for example 0.3 millimeter in the Figures, but the stroke is drawn drasticly enlarged in the Figures, because the lines are bigger than the stroke and the stroke would not be visible if the drawing would also regarding the axial stroke be drawn in a 1/1 scale.

The elements are on their radial outer ends provided with annular noses 120,121 with which the elements are laid together. A centering ring 116 is provided radially inwards of the mentioned noses and forms radially inwards of the centering ring 116 the seat for the plastic seal ring, namely seat 92, as known from the earlier Figure(s). The radial inner ends the elements are provided with the seal ring seats 118,119 respectively, and towards the face whereonto the elements are laid. Member 117 serves for dead space filling.

The piston shoe 109 is provided with a fluid supply entrance passage 73 as generally known from earlier Figures. However, the presently discussed Figures now show in detail that the passage 73 is provided with a connection thread for the reception of a connector 131. The piston shoe is provided with a plane end face 135. The connector 131 is threaded into the thread of passage 73 and provided with a seal ring seat 132 towards the plane end face 135. Connector 131 has a passage 136 which extends into the flexible hose 133 with the hose leading to the lubrication fluid supply pump which is known in the art and not shown in the Figures. The flexibility of the hose 133 permits the up-down and left-right movement of the connector 131 in the outcut 134 of the housing 107 whereby the connector 131 can follow the slight movements of the piston shoe 109. FIG. 14 illustrates in addition the location of the several fluid pressure pockets 69 and together with the other now discussed Figures the communication passages 72 between the supply passage 73 and the pockets 69 or 70 on the top or bottom of the piston shoe. The now discussed Figures also serve to show the actual locations of the respective parts relative to each other and also show an actual design.

The inlet and outlet valves are now with their chambermost ends very close to the pumping chamber 14 and prevent dead space whereby losses by internal compression in fluid in dead spaces are prevented.

In should be understood that the arrangement of the now discussed Figures can never work with the desired high water jet cutting pressures if other drive means are provided to the piston than the eccentric cam and the piston shoe of the Figures. Note also that the piston must be guided with its outer face 182 on the housing's inner cylindrical face 181 because the style of FIG. 6 has a tendency of pivoting the piston shoe together with the piston if the friction on the faces of the piston shoe and the stroke guide eccenter cam becomes too high.

Figure 15:
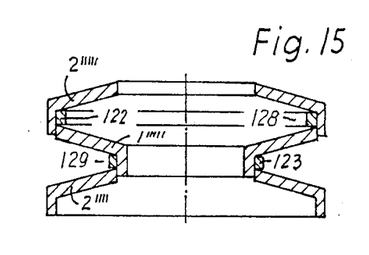

FIGS. 15 and 16 bring modifications and improvements relative to the arrangement of FIGS. 1,2 and 5. In FIG. 15 the distance rings 122 and 123 are laid between adjacent elements 1''''' and 2''''' in order to form radially of them the seal ring seats 128 and 129 respectively. Thereby the arrangement can become used as fluid pump because the elements are now perfectly seale relatively to each other.

Figure 16:
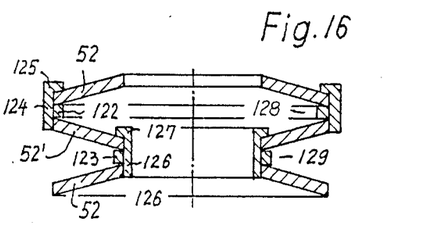
FIG. 16 is a longitudinal sectional view through still another assembly of members of embodiments of the present invention.

In FIG. 16 the common disc pings 52 and 52' are used to become able to pump a fluid. This is obtained by the insertion of distance rings 122 and 123 between the inner or outer radial endportions of the respective disc springs, respectively. To center the neighboring disc spring relative to each other, the holder rings 124,126 with end boads 125,127, respectively, are provided to embrance the radial inner or outer ends of the respective neighboring disc springs. Note that for high pressure the rings should not contract or expand more the 0.3 percent of their diamters for long life time. Correspondingly, for high pressure the elements or disc springs should not deflect more than 2 or 3 degrees. Then their outer ends obtain equal deflection of 0.3 percent, corresponding to those of the rings 124,126.

Note further that the axially big elements 1'''' and 2'''' of FIGS. 12 to 14 should be calculated in accordance with the equations which are given in FIGS. 23 and 24 of my U.S. Pat. No. 4,569,630 because the forces of fluid under the elements cause otherwise higher stresses in the elements than the axial compression of the elements cause and the elements 1'''' and 2'''' would then break under the high forces of fluid in the pumping chamber 14.

The invention is still more in detail described in the appended claims and the claims are thereby considered to be a portion of the description of the objects of the invention and of the preferred embodiments of the invention.

What is claimed is:

1. A fluid flow facilitating device with means for periodic alternating inflow and outflow of fluid over an inlet valve and an outlet valve into and out of an interior chamber inside of the coned portion of a coned ring, comprising in combination, a first body, said coned ring and a second body with said coned ring inserted between said first and second bodies, said coned ring comprising said coned portion between a radial inner and a radial outer portion with said interior space formed radially inwards of said coned portion;

wherein said radial outer portion of said coned rings forms a seat face portion, wherein one of said bodies forms a complementary face portion, wherein a drive means is provided to subject said coned ring to periodic axial expansion and compression, said drive means includes a rotary shaft having a first axis with a relative to said axis accentrically located cylindrical guide face radially around said shaft and a piston with a piston shoe interposed between said coned ring and said eccentric guide face, wherein a housing portion is provided to hold said shaft and said coned ring, wherein said housing portion includes a cylindrical portion with a cylindrical inner face around a common axis, said common axis coincides substantially with the axis of said coned rings, said piston has a cylindrical outer face substantially slideably fitting in said cylindrical inner face, wherein said second body forms said piston shoe provided between said eccentrically located cylindrical guide face and said piston, while said piston is reciprocated in said cylindrical portion along said common axis and provided on one end of its axial ends with a bearing face to bear thereon a portion of said coned ring, wherein said piston forms on its other axial end a bearing bed with a constant radius around a center while said piston shoe forms a pivot face with an equal constant radius around said center and a slide face of a part cylindrical configuration complementary to a portion of said eccentrically located cylindrical guide face, and;

wherein said part cylindrical face is laid onto said cylindrical guide face while said pivot face is laid into said bearing bed, whereby said piston and said coned ring are substantially guided along said common axis to prevent radial departures of said coned ring and piston at compression and expansion of said coned ring away from said common axis, while said piston shoe is pivotably kept on said piston and said slide face of said piston shoe is slideably kept on said eccentrically located, cylindrical guide face.

2. In a fluid flow facilitating device, in combination, a body provided with inlet means and outlet means which face and communicate to a working chamber for the reception and expulsion of a fluid and a compression and expansion actuator;

wherein said working chamber is formed between said body and at least one annular coned spring with a concentric bore in said spring, making it annular, wherein said coned annular spring is laid with its radial inner portion onto said body and sealed with its inner portion relatively to said body;

wherein the radial inner portion of at least one of said at least one spring is laid onto said compression and expansion actuator;

wherein said actuator is provided with means to close the inner bore of said spring and said device periodically provides a compression stroke to said spring and a departure stroke which permits said spring to expand from its compression;

wherein said actuator compresses said coned portion of said spring at said compression stroke substantially to a flat ring, whereby said chamber reduces to a volume of substantially zero in order to expel at least the majority of the fluid which was entered into said chamber during expansion stroke;

wherein said inlet means is a valve which includes a head to seat and open on and from a respective valve seat, while said head and seat are configurated to prevent any dead space between said valve, said valve seat and said coned annular spring, wherein said seat is a coned seat and said head forms on one of its axial ends a first radially plane face, said head is moveable towards and rearwards respective to said working chamber, and;

wherein said working chamber is bordered by a second radially plane face on a wall which closes a portion of said chamber and wherein said radially plane faces coincide in a common radial plane at times when said inlet valve is closed.

3. A fulid flow facilitating device with means for periodic inflow and outflow of fluid over an inlet valve and an outlet valve into and out of an interior chamber inside of a coned portion of a coned ring, comprising in combination, a first body, a first coned ring and a second body with said first coned ring inserted between said first and second bodies, said first coned ring comprising a coned portion between a radial inner and a radial outer portion with an interior space formed radially inwards of said coned portion;

wherein said radial inner portion of said first coned ring forms a seat face portion, wherein one of said bodies forms a complementary face portion, wherein said complementary face portion is laid against said seat face portion, whereby said first coned ring is borne on said first body, wherein said first coned ring is a disc spring capable of axial compression and expansion of its coned ring portion, wherein a second coned ring is arranged axially of said first coned ring with said coned rings arranged in axially opposed directions of their coned portions, wherein one of said coned rings is borne on a piston which constitutes said second body which is reciprocably provided in a housing with a cylindrical inner face to guide the outer face of said piston at its reciprocable movement, wherein a drive means is provided to drive said piston towards said coned ring to compress said coned ring and to guide the expansion of said coned ring while said drive means includes a piston shoe pivotably borne on said piston and guided with its slide face on a cylindrical but relative to the axis of a shaft eccentric guide face of a cam provided on said shaft, whereby said piston shoe is interposed between said piston and said cam, and, wherein said shaft is revolvably borne in a housing which houses said coned rings, piston, piston shoe and cam, while the interior of said coned rings forms a pumping chamber which takes in fluid through and entrance valve in said housing and expels fluid through an exit valve in said housing.

4. The device of claim 3.

wherein a fluid supply arrangement is connected to said piston shoe, wherein said fluid supply arrangement includes a flexible fluid line from a lubrication fluid supply pump to an entrance port of said piston shoe, wherein fluid pressure pockets which constitute hydrostatic bearings are provided between said guide face of said cam and between said piston shoe and said piston with said pockets communicated by passages to said entrance port of said piston shoe, and , wherein said housing is provided with an opening for the extension of a portion of said fluid supply arrangement through said opening, whereby said lubrication fluid is led from said pump through said housing to and into said pockets of said piston shoe.

5. A fluid flow facilitating device with means for the periodic inflow and outflow of fluid over an inlet valve and an outlet valve into and out of an interior chamber inside of a coned portion of a coned ring, comprising, in combination, a first body, a coned ring and a second body with said coned ring inserted between said first and second bodies, said coned ring comprising a coned portion between a radial inner and a radial outer portion with an interior space formed radially inwards of said coned portion;

wherein said radial outer portion of said coned ring forms a seat face portion, wherein one of said bodies forms a complementary face portion, wherein said complementary face portion is laid against said seat face portion, whereby said coned ring is borne on said body, wherein said coned ring is a disc spring capable of axial compression and expansion of its coned ring portion, wherein a drive means is provided to subject said coned ring to periodically alternating compression and expansion, said drive means includes a rotary shaft having a first axis with a relative to said first axis eccentrically located, cylindrical guide face and a piston and a piston shoe interposed between said coned ring and said eccentric guide face, wherein a housing portion is provided to hold said shaft and said coned ring, wherein said housing portion includes a cylindrical portion with a cylindrical inner face around a common axis which is normal relative to said first axis, said common axis coincides substantially with the axis of said coned ring, said piston has a cylindrical outer face substantially slideably fitting in said cylindrical inner face, and;

wherein said piston shoe is provided between said eccentrically located cylindrical guide face and said piston, while said piston is reciprocated in said cylindrical portion along said common axis and provided on one of its axial ends with a bearing face to bear thereon a portion of said coned ring, whereby said piston and said coned ring are substantially guided along said common axis to prevent radial departures of said coned ring and piston at compression and expansion of said coned ring away from said common axis.

6. The arrangement of claim 5,
wherein said radial outer portion forms on its radial outer end an axially extending cylindrical portion of a first and inner diameter while said body is a second disc spring with an axially oppositionally directed coned portion and with an outer diameter forming a second diameter, and, wherein said second disc spring is laid into said disc spring with said first diameter surrounding said second diameter and a slight difference between said diameters provides a small clearance between said diameters to permit differences of radial expansions at axial compressions of the coned portions of said coned rings and disc springs.

7. The arrangement of claim 5,
wherein two disc springs are arranged axially of each other in axially opposed directions of the coned portions, and, wherein a hollow, axially uncompressible, radially plane, ring is laid between the radial outer portions of said two springs to form an outer ring for the provision of a seat for a plasticly deformable seal ring radially inside of said outer ring.

* * * * *